(12) United States Patent
Osawa et al.

(10) Patent No.: US 8,448,621 B2
(45) Date of Patent: May 28, 2013

(54) ENGINE START CONTROL SYSTEM AND METHOD

(75) Inventors: Toshifumi Osawa, Saitama (JP);
Toshiya Nagatsuyu, Saitama (JP);
Kanichiro Ogiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 516 days.

(21) Appl. No.: 12/831,690

(22) Filed: Jul. 7, 2010

(65) Prior Publication Data

US 2011/0017165 A1    Jan. 27, 2011

(30) Foreign Application Priority Data

Jul. 21, 2009  (JP) ................ 2009-170032

(51) Int. Cl.
*F02N 11/08* (2006.01)
*G06F 19/00* (2011.01)
*G06G 7/70* (2006.01)

(52) U.S. Cl.
USPC ............ 123/179.4; 701/112; 701/113

(58) Field of Classification Search
USPC ............ 123/179.1–4, 28, 321, 332, 333, 123/339, 339.14, 198 DC; 701/112–113; 180/25, 65
See application file for complete search history.

(56) References Cited

U.S. PATENT DOCUMENTS

| | | | |
|---|---|---|---|
| 4,417,288 A * | 11/1983 | Hattori et al. | |
| 4,997,237 A * | 3/1991 | Ricker et al. | |
| 2004/0055799 A1* | 3/2004 | Atarashi et al. | |
| 2010/0250105 A1* | 9/2010 | Nagatsuyu et al. | |

FOREIGN PATENT DOCUMENTS

| | | |
|---|---|---|
| EP | 1 365 145 A2 | 11/2003 |
| EP | 1 406 010 A2 | 4/2004 |
| JP | 3969641 B2 | 6/2007 |

* cited by examiner

*Primary Examiner* — Stephen K Cronin
*Assistant Examiner* — Pedro Gomez
(74) *Attorney, Agent, or Firm* — Squire Sanders (US) LLP

(57) ABSTRACT

An engine start control system is provided that includes a controller configured to perform an idle stop control to stop an engine based on an establishment of a condition. The system further includes a motor configured to reverse-rotationally drive a crankshaft to a predetermined position for normal-rotational or reverse-rotational driving, after engine stop. The controller includes a reverse-rotational drive controller configured to reverse-rotationally drive the motor at a rewinding control duty ratio immediately after the engine is stopped. The controller further includes a reverse-rotation stop condition processor configured to detect whether the crankshaft is rewound to the predetermined position by the reverse-rotational drive controller. Further, the controller includes a motor brake controller configured to apply a brake to the crankshaft by reverse-rotationally driving the motor when it is detected that the crankshaft is rewound to the predetermined position. The motor brake controller is configured to apply the brake stepwise.

19 Claims, 12 Drawing Sheets

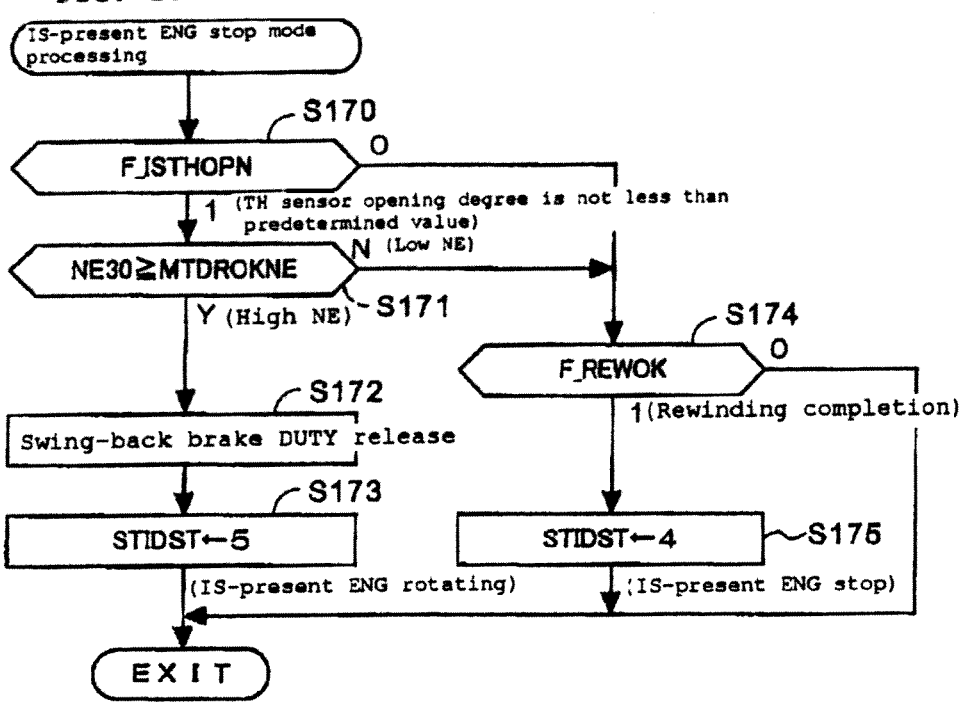

ENGINE START CONTROL SYSTEM AND METHOD

BACKGROUND

1. Field

Embodiments of the invention relate to engine start control systems and more particularly to an engine start control system which reverse-rotationally drives a crankshaft to a predetermined position immediately after an engine has been stopped.

2. Description of the Related Art

An idle stop (idling stop) control is known in which at the time of temporary stop, such as waiting at stoplights, and upon establishment of predetermined conditions, an engine is temporarily stopped and thereafter is restarted in response to a throttle operation to restart moving. At the time of temporarily stopping the engine by this idle stop control, "rewinding control" may be exercised in which a crankshaft is reverse-rotationally driven to a predetermined position immediately after the engine stop in order to improve engine startability. However, an appropriate position to stop the reverse-rotational drive using this idle stop control is immediately rearward of compression top dead center. Therefore, because of "swing-back," it is difficult to stop the crankshaft at the appropriate position only by cutting electricity to an alternating-current generator starter motor along with detection of the predetermined position. During "swing-back," a piston is pushed back by a compression reactive force to drive the crankshaft in a normal-rotational direction.

Japanese Patent No. 3,969,641 ("JP 3969641") discloses the following technology. In "rewinding control" at the time of stopping an engine by idle stop control, when it is detected that a crankshaft is rewound to a predetermined position immediately rearward of compression top dead center, reverse-rotational drive is executed at a second duty ratio set to a value smaller than that of a first duty ratio applied to the "rewinding control." This reduces an amount of displacement in the normal-rotational direction due to "swing-back."

In the engine start control system, as described in JP 3969641, it is necessary to reduce the second duty ratio applied to the reverse-rotational drive to reduce the "swing-back" so not to pass compression top dead center. In some situations, the period of time from the convergence of "the swing-back" to the complete stop of the crankshaft tends to elongate. If the first duty ratio applied to the "rewinding control" is increased to increase the speed of reverse-rotational drive, "the swing-back" resulting from the compression reactive force is increased. Consequently, it is difficult to shorten the time taken to complete the "rewinding control."

SUMMARY

Embodiments of the invention shorten an amount of time taken to complete "rewinding control" at the time of moving into idle stop control.

An embodiment of the invention provides an engine start control system that includes a controller configured to perform an idle stop control to stop an engine based on an establishment of a condition. The system further includes a motor configured to reverse-rotationally drive a crankshaft to a predetermined position for normal-rotational or reverse-rotational driving, after engine stop. The controller includes a reverse-rotational drive controller configured to reverse-rotationally drive the motor at a rewinding control duty ratio immediately after the engine is stopped. The controller further includes a reverse-rotation stop condition processor configured to detect whether the crankshaft is rewound to the predetermined position by the reverse-rotational drive controller. Further, the controller includes a motor brake controller configured to apply a brake to the crankshaft by reverse-rotationally driving the motor when it is detected that the crankshaft is rewound to the predetermined position. The motor brake controller is configured to apply the motor brake stepwise.

In accordance with another embodiment of the invention, there is provided an engine start control system that includes a controlling means for performing an idle stop control to stop an engine based on an establishment of a condition. The system further includes driving means for reverse-rotationally driving a crankshaft to a predetermined position for normal-rotational or reverse-rotational driving, after the engine is stopped. The controlling means includes reverse-rotational drive controlling means for reverse-rotationally driving the motor at a rewinding control duty ratio immediately after the engine is stopped. The controlling means further includes reverse-rotation stop condition processing means for detecting whether the crankshaft is rewound to the predetermined position by the reverse-rotational drive controller. Further, the controlling means includes motor brake controlling means for applying a brake to the crankshaft by reverse-rotationally driving the motor when it is detected that the crankshaft is rewound to the predetermined position. The motor brake controlling means is for applying the motor brake stepwise.

In accordance with another embodiment of the invention, there is provided a method. The method includes performing, using a controller, an idle stop control to stop an engine based on an establishment of a condition. The method further includes reverse-rotationally driving, using a motor, a crankshaft to a predetermined position for normal-rotational or reverse-rotational driving, after the engine is stopped. Reverse-rotationally driving the crankshaft includes reverse-rotationally driving the motor at a rewinding control duty ratio immediately after the engine is stopped. Reverse-rotationally driving the crankshaft further includes detecting whether the crankshaft is rewound to the predetermined position by the reverse-rotational drive controller, and applying a brake to the crankshaft by reverse-rotationally driving the motor when it is detected that the crankshaft is rewound to the predetermined position. The brake is applied stepwise.

In accordance with another embodiment of the invention, a duty ratio applied to the motor brake can be set to a value smaller than the rewinding control duty ratio. The motor brake controller can be configured to apply the motor brake stepwise using a plurality of different duty ratios.

In accordance with another embodiment of the invention, the motor brake can be configured to apply the motor brake stepwise while reducing the plurality of different duty ratios stepwise.

In accordance with another embodiment of the invention, the motor brake controller can be configured to apply the motor brake stepwise using a first duty ratio and a second duty ratio smaller than the first duty ratio.

In accordance with another embodiment of the invention, the motor brake controller can be configured to apply the motor brake at the first duty ratio for a first predetermined period of time (T1) and thereafter apply the motor brake at the second duty ratio for a second predetermined period of time (T2).

In accordance with another embodiment of the invention, the engine start control system can include a motor angle sensor configured to detect a rotation angle of the motor, wherein the reverse-rotation stop condition processor can be configured to determine that the crankshaft is rewound to the predetermined position when a currently measured passage time reaches a value not less than a predetermined multiplied value of an immediately previously measured passage time based on a time at which a predetermined rotation angle detected by the motor angle sensor passes.

In accordance with another embodiment of the invention, the engine start control system can include a motor angle sensor configured to detect a rotation angle of the motor, wherein the reverse-rotation stop condition processor can be configured to determine that the crankshaft is rewound to the predetermined position when it is determined that the crankshaft turns into a normal-rotation from a reverse-rotation based on a passage state of a predetermined rotation angle detected by the motor angle sensor.

In accordance with another embodiment of the invention, the engine start control system can include a throttle opening degree sensor configured to detect a throttle opening degree, wherein; the rewinding control can involve the reverse-rotational drive and the motor brake controller; and wherein the idle stop start-time rewinding control unit can be configured to restart the engine when an output value of the throttle opening degree sensor exceeds a predetermined value during the idle stop control, and even during the application of the motor brake, and can be configured to start the normal-rotational drive of the motor to restart the engine (E) when an output value of the throttle opening degree sensor exceeds a predetermined value.

In accordance with another embodiment of the invention, during the execution of the reverse-rotational drive, the idle stop start-time rewinding control unit can be configured to stop the reverse-rotational drive and start normal-rotational drive of the motor to restart the engine (E) when rotation speed of the crankshaft exceeds a predetermined value and an output value of the throttle opening degree sensor exceeds a predetermined value.

Embodiments of the invention provide non-obvious advantages over conventional engine start control systems. For example, according to an embodiment of the invention, the idle stop start-time rewinding control unit can be configured to include the reverse-rotational drive controller configured to reverse-rotationally drive the motor at a rewinding control duty ratio immediately after the engine stop. The reverse-rotation stop condition processor can be configured to detect that the crankshaft is rewound to the predetermined position by the reverse-rotational drive, and the motor brake controller can be configured to apply a motor brake to the crankshaft by reverse-rotationally driving the motor when it is detected that the crankshaft is rewound to the predetermined position. The motor brake controller can be configured to apply the motor brake stepwise. Even if "swing-back" occurs during reverse-rotational drive, whereby the piston is pushed back by a compression reactive force to rotate the crankshaft in the normal-rotational direction, the movement of the crankshaft in the normal-rotational direction can be prevented by the motor brake. Thus, it can be possible to allow the "swing-back" to converge in a short time and stop the crankshaft at an appropriate position.

According to an embodiment of the invention, the duty ratio applied to the motor brake is set to a value smaller than the rewinding control duty ratio, and the motor brake controller can be configured to apply the motor brake stepwise using a plurality of different duty ratios. Thus, it can be possible to exercise the precise stepwise control on the motor brake.

According to an embodiment of the invention, the motor brake controller can be configured to apply the motor brake stepwise while reducing the plurality of different duty ratios stepwise. Therefore, since a strong motor brake can be applied and then gradually weakened, the normal-rotation can be suppressed by the strong motor brake immediately after the start of "the swing-back" and for a period of large rotational torque in the normal-rotational direction. Thereafter, the occurrence of a compression reactive force can be suppressed by the weaker motor brake. Thus, it can be possible to allow "the swing-back" during the reverse-rotational drive to converge in a short time.

According to an embodiment of the invention, the motor brake controller can be configured to apply the motor brake stepwise using a first duty ratio and a second duty ratio smaller than the first duty ratio. Therefore, the accuracy of the motor brake control can be enhanced.

According to an embodiment of the invention, the motor brake controller can continue to apply the motor brake at the first duty ratio for a first predetermined period of time and thereafter apply the motor brake at the second duty ratio for a second predetermined period of time. Therefore, the accuracy of the motor brake control can be further enhanced.

According to an embodiment of the invention, the motor angle sensor can be included and can be configured to detect a rotation angle of the motor. The reverse-rotation stop condition processor can be configured to determine whether that the crankshaft is rewound to the predetermined position when a currently measured passage time reaches a value not less than a predetermined multiplied value of an immediately previously measured passage time based on a time at which a predetermined rotation angle detected by the motor angle sensor passes. Thus, it is possible to detect that the crankshaft is rewound to the predetermined position based on a lowering of reverse-rotational drive speed resulting from the compression reactive force. In addition, it can be possible to easily vary the position where the reverse-rotational drive is stopped in accordance with the specifications of the engine.

According to an embodiment of the invention, the motor angle sensor can be included and can be configured to detect a rotation angle of the motor. The reverse-rotation stop condition processor can be configured to determine that the crankshaft is rewound to the predetermined position when it is determined that the crankshaft is turned into a normal-rotation from a reverse-rotation based on a passage state of a predetermined rotation angle detected by the motor angle sensor. Thus, it can be easily detected that the crankshaft is rewound to the predetermined position.

According to an embodiment of the invention, a throttle opening degree sensor can be included and can be configured to detect a throttle opening degree. The rewinding control can involve the reverse-rotational drive and the motor brake. The idle stop start-time rewinding control unit can be configured to restart the engine when an output value of the throttle opening degree sensor exceeds a predetermined value during the idle stop control, and even during the application of the motor brake, can be configured to start the normal-rotational drive of the motor to restart the engine when an output value of the throttle opening degree sensor exceeds a predetermined value. Therefore, when the throttle operation is performed during the rewinding control, timing to start the normal-rotation can be advanced compared with, for example, switching the reverse-rotation to the normal-rotation after waiting for the completion of the motor brake. Thus, it can be possible to shorten the period of time from the start of the throttle operation to the restart of the engine.

According to an embodiment of the invention, even during the execution of the reverse-rotational drive, the idle stop start-time rewinding control unit can be configured to stop the reverse-rotational drive and start normal-rotational drive of the motor to restart the engine when rotation speed of the crankshaft exceeds a predetermined value and an output value of the throttle opening degree sensor exceeds a predetermined value. Thus, when the throttle operation is performed during the rewinding control, timing to start the normal-rotation can significantly be advanced compared with, for example, switching the reverse-rotation to the normal-rotation after waiting for the completion of the reverse-rotational drive and of the motor brake.

BRIEF DESCRIPTION OF DRAWINGS

FIG. 15 is a flowchart illustrating a procedure for idle stop-present engine stop mode processing, in accordance with an embodiment of the invention.

DETAILED DESCRIPTION OF EMBODIMENTS

Figure 1:
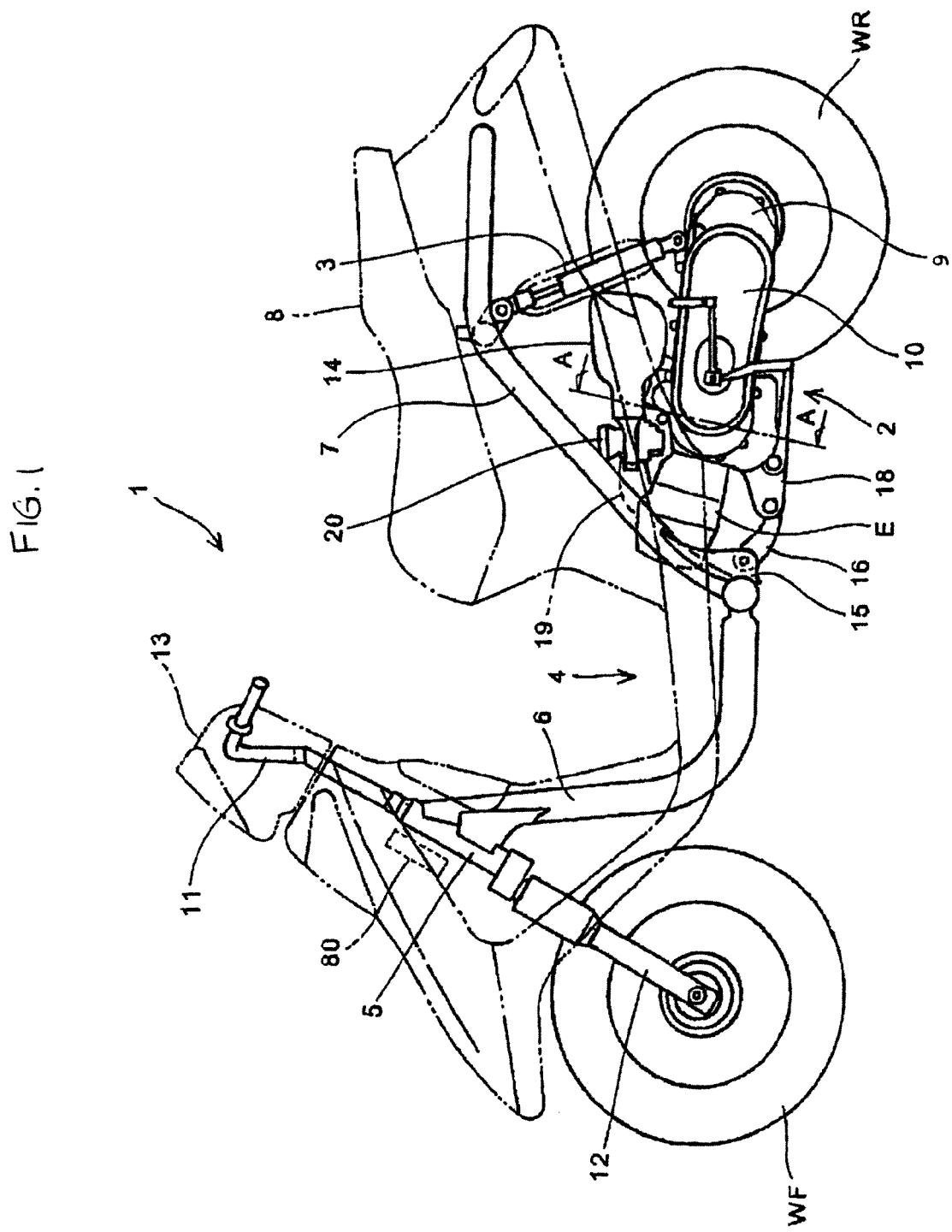
FIG. 1 is a lateral view of a scooter-type motorcycle including an engine start control system, in accordance with an embodiment of the invention.

Embodiments of the invention will be described in detail below with reference to the drawings. FIG. 1 is a lateral view of a scooter-type motorcycle 1 including an engine start control system, in accordance with an embodiment of the invention. A front portion of a vehicle body can be connected to a rear portion of the vehicle body via a low-floor portion 4. A body frame can include a down tube 6 and a main pipe 7. A seat 8 can be disposed above the main pipe 7.

A handlebar 11 can be pivotally supported by a head pipe 5 and can extend upward therefrom. A front fork 12 rotatably supporting a front wheel WF can be joined to a lower side of the head pipe 5. A handlebar cover 13 also serving as an instrumental panel can be attached to the upper portion of the handlebar 11. An ECU 80 serving as an engine start control system can be disposed forward of the head pipe 5.

As further illustrated in FIG. 1, a bracket 15 can be provided at a rear end of the down tube 6 and can project from an erecting portion of the main pipe 7. A hunger bracket 18 of a swing unit 2 can be swingably supported by the bracket 15 via a link member 16.

A four-cycle, single-cylinder engine E can be disposed in a front portion of the swing unit 2. A continuously variable transmission 10 can be disposed rearward of the engine E. A rear wheel WR can be rotatably supported by an output shaft of a speed-reduction mechanism 9. A rear cushion unit 3 can be interposed between the upper end of the speed-reduction mechanism 9 and a bent portion of the main pipe 7. A throttle body 20 of a fuel injection unit connected to an intake pipe 19 extending from the engine E and an air cleaner 14 can be arranged above the swing unit 2.

Figure 2:
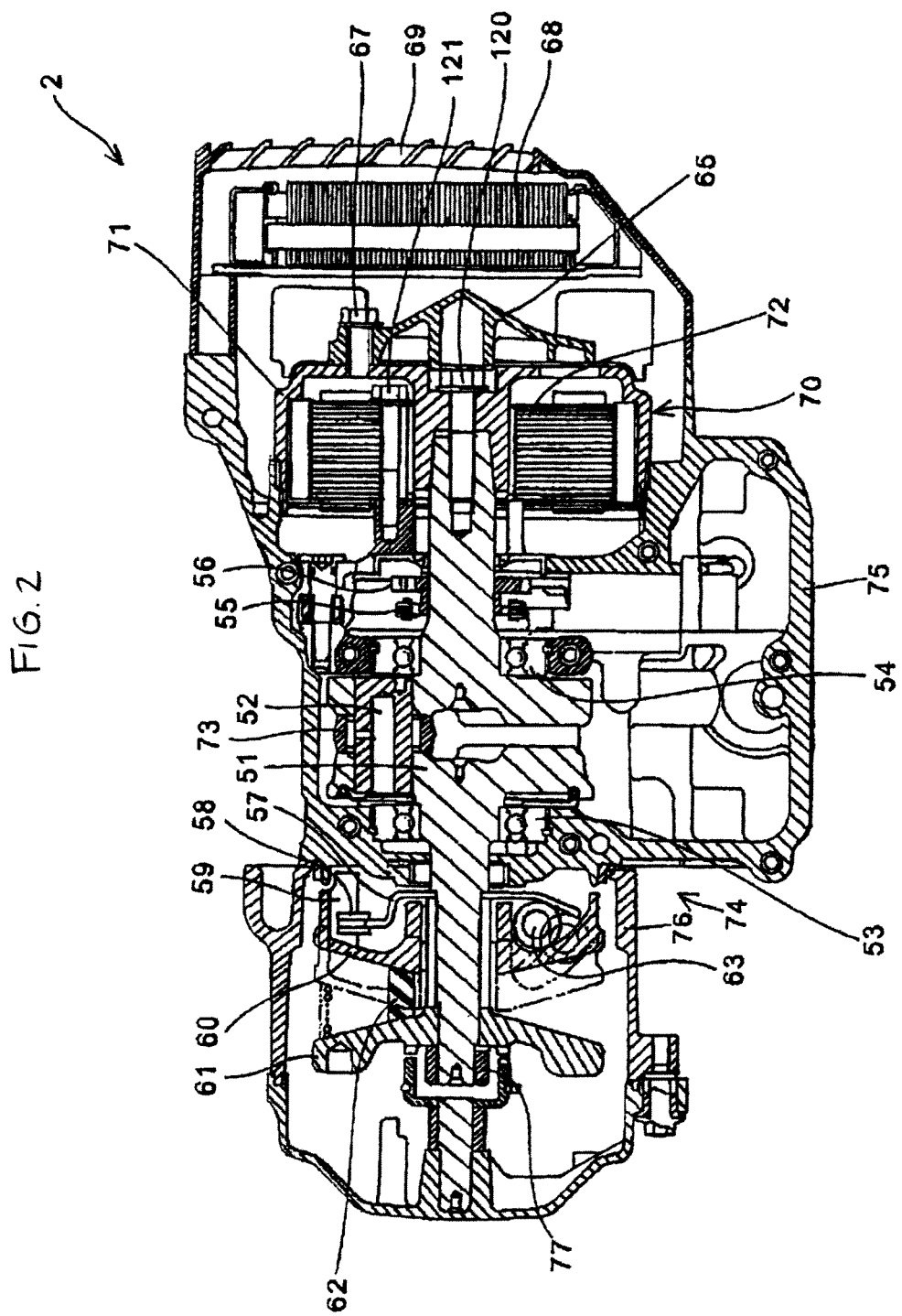
FIG. 2 is a cross-sectional view taken along line A-A of FIG. 1, in accordance with an embodiment of the invention.

FIG. 2 is a cross-sectional view taken along line A-A of FIG. 1, in accordance with an embodiment of the invention. The swing unit 2 can include a crankcase 74 that can be composed of a right case 75 on the vehicle-widthwise right and a left case 76 on the vehicle-widthwise left. A crankshaft 51 can be rotatably supported by bearings 53, 54 secured to the crankcase 70. A connecting rod 73 can be connected to a crankshaft 51 via a crankpin 52.

The left case 76 can also serve, for example, as a speed-change chamber case. A belt drive pulley can include a movable-side pulley half body 60 and a fixed-side pulley half body 61 and can be mounted to a left end portion of the crankshaft 51. The fixed-side pulley half body 61 can be fastened to a left end portion of the crankshaft 51 using a nut 77. The movable-side pulley half body 60 can be spline fitted to the crankshaft 51 to be axially slidable. A V-belt 62 can be wound between both the pulley half bodies 60, 61.

A ramp plate 57 can be secured to the crankshaft 51 on the right side of the movable-side pulley half body 60. A slide piece 58 can be attached to an outer circumferential end portion of the ramp plate 57. This slide piece 58 can be engaged with a ramp plate slide boss portion 59 axially formed at an outer circumferential end of the movable-side pulley half body 60. A taper surface can be formed on the outer circumferential portion of the ramp plate 57 to slant toward the movable-side pulley half body 60 as it goes toward the radial outside. A plurality of weight rollers can be received between the taper surface and the movable-side pulley half body 60.

As the rotational speed of the crankshaft 51 is increased, the weight rollers 63 can be moved radially outward by a centrifugal force. This allows the movable-side pulley half body 60 to move leftward in the figure and come close to the fixed-side pulley half body 61. Consequently, the V-belt 62 sandwiched between both the pulley half bodies 60, 61 can be moved radially outward to increase the winding diameter. A driven pulley (not illustrated) which varies the winding diameter of the V-belt 62 in response to both the pulley half bodies 60, 61 can be provided on the rear side of the swing unit 2. The drive force of the engine E can be automatically adjusted by the belt transmission mechanism and can be transmitted to the rear wheel WR via a centrifugal clutch (not illustrated) and the speed-reduction mechanism 9 (see FIG. 1).

An ACG starter motor 70 combining a starter motor with an AC generator can be disposed inside the right case 75. The ACG starter motor 70 can include an outer rotor 71 secured to a distal taper portion of the crankshaft 51 using attachment bolts 120, and a stator 72 disposed inside the outer rotor 71 and secured to the right case 75 using attachment bolts 121. A radiator 68 and a cover member 69 formed with a plurality of slits can be mounted on the right side, in FIG. 2, of a blast fan 65 secured to the outer rotor 71 using attachment bolts 67.

A sprocket 55 can be secured to the crankshaft 51 between the ACG starter motor 70 and the bearing 54. A cam chain can be wound around the sprocket 55 to drive a camshaft not illustrated. The sprocket 55 can be formed integrally with a gear 56 configured to transmit power to an oil pump (not illustrated) circulating engine oil.

Figure 3:
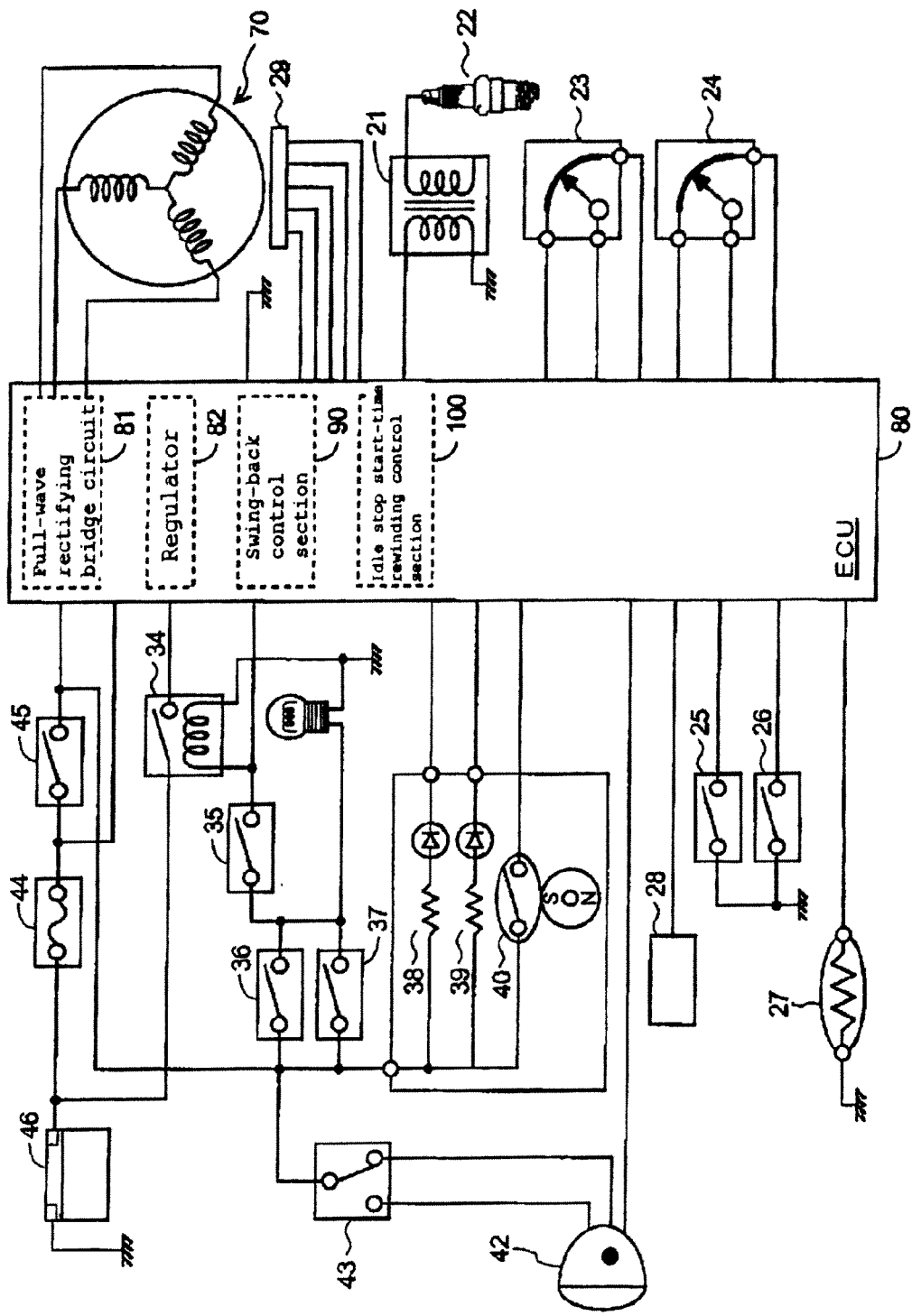
FIG. 3 is a block diagram of a control system of an ACG starter motor, in accordance with an embodiment of the invention.

FIG. 3 is a block diagram of a control system of the ACG starter motor 70, in accordance with an embodiment of the invention. The same reference numerals as in the foregoing figures denote like or corresponding elements or portions. The ECU 80 can include a full-wave rectifying bridge circuit 81 for full-wave rectifying three-phase alternate current of the ACG starter motor 70, and a regulator 82 for limiting the output of the full-wave rectifying bridge circuit 81 to a planed regulator voltage (regulator operating voltage, for example, 14.5V). The ECU 80 can further include a swing-back control unit 90 for reversely rotating the crankshaft 51 to a predetermined position at the time of starting the engine, and an idle stop start-time rewinding control unit 100 for reversely rotating the crankshaft 51 to a predetermined position at the time of starting idle stop. The predetermined position may include, for example, a position before, at, or after top dead center.

As further illustrated in FIG. 3, a fuel injection device 28, a motor angle sensor 29, an ignition coil 21, a throttle opening degree sensor 23, a fuel sensor 24, a seat switch 25 detecting a sitting state of an occupant, an idle stop control permission switch 26, a cooling water temperature sensor 27 and an ignition pulser 30 can be connected to the ECU 80. Detection signals can be supplied from these parts to the ECU 80. An ignition plug 22 can be connected to the secondary side of the ignition plug 22.

Further, a starter relay 34, a starter switch 35, stop switches 36, 37, a standby indicator 38, a fuel indicator 39, a vehicle-speed sensor 40 and a headlight 42 can be connected to the ECU 80. The headlight 42 can be provided with a dimmer switch 43. Electric power can be supplied from a battery 46 to the above-mentioned parts via a main fuse 44 and a main switch 45.

The ECU (the engine start control system) 80, in accordance with an embodiment of the embodiment can perform "engine start-time swing-back control." In this engine start-time swing-back control, when the engine E is started by operating the starter switch 35 (see FIG. 3) from the state where the engine E is at rest, the crankshaft 51 can be once reversed, i.e., swung back to a predetermined position and then operated to start a normal rotation. This can elongate a runup period to compression top dead center, thereby increasing the rotational speed of the crankshaft 51 to progress over the compression top dead center. This engine start-time swing-back control can enhance startability encountered when the engine is started up by the starter switch 35.

Additionally, the ECU 80 can perform idle stop control in which the engine can be stopped when predetermined conditions are satisfied at the time of temporary stop, such as waiting at stoplights or the like. For example, the predetermined conditions can include a given period of time elapses in the state where the idle stop control permission switch 26 is turned on, the sitting of an occupant is detected by the seat switch 35, and a vehicle speed detected by the vehicle speed sensor 40 is equal to or lower than a given value (e.g., 5 km/h).

Further, the predetermined conditions can include an engine speed detected by the ignition pulser 30 is equal to or lower than a given value (e.g. 2000 rpm), and a throttle opening degree detected by the throttle opening degree sensor 23 is equal to or lower than a given value (e.g., 5 degrees). If the throttle opening degree becomes the given value or more in the idle stop control, the ECU 80 can normal-rotationally drive the ACG starter motor 70 to restart the engine E.

Further, the ECU 80 can be configured to perform "idle stop start-time rewinding control," whereby when the above-mentioned idle stop conditions are satisfied and the engine E is once stopped, the crankshaft 51 can be reversed, i.e., rewound to a predetermined position from a position where the crankshaft 51 is stopped. The rewinding control can enhance startability by elongating the runup period to the compression top dead center also when the throttle opening degree becomes the predetermined value or more and the engine is restarted. However, the rewinding control can not be performed when the main switch 35 is turned off to stop the engine E.

Figure 4:
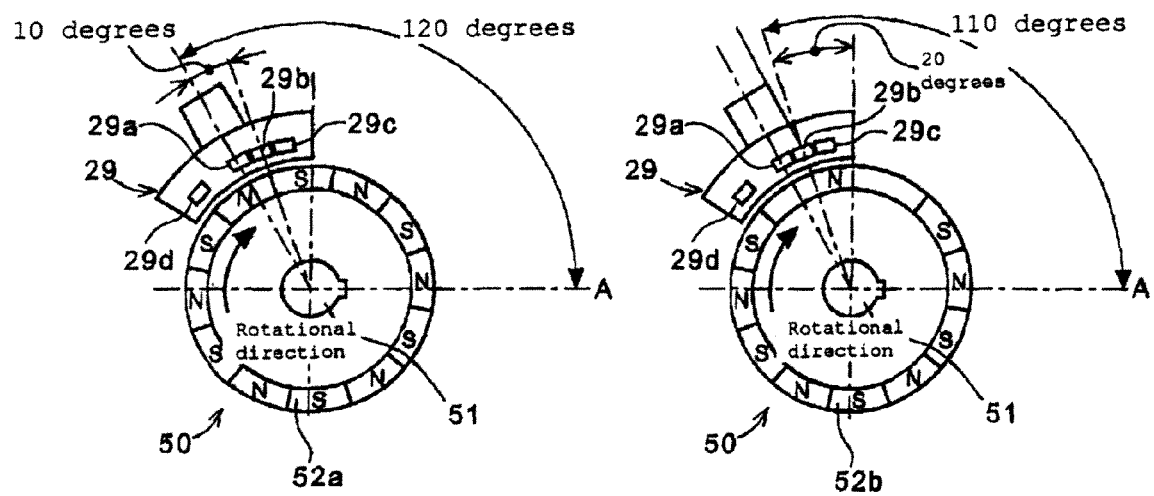
FIG. 4 is a front view of a motor angle sensor, in accordance with an embodiment of the invention.
Figure 5:
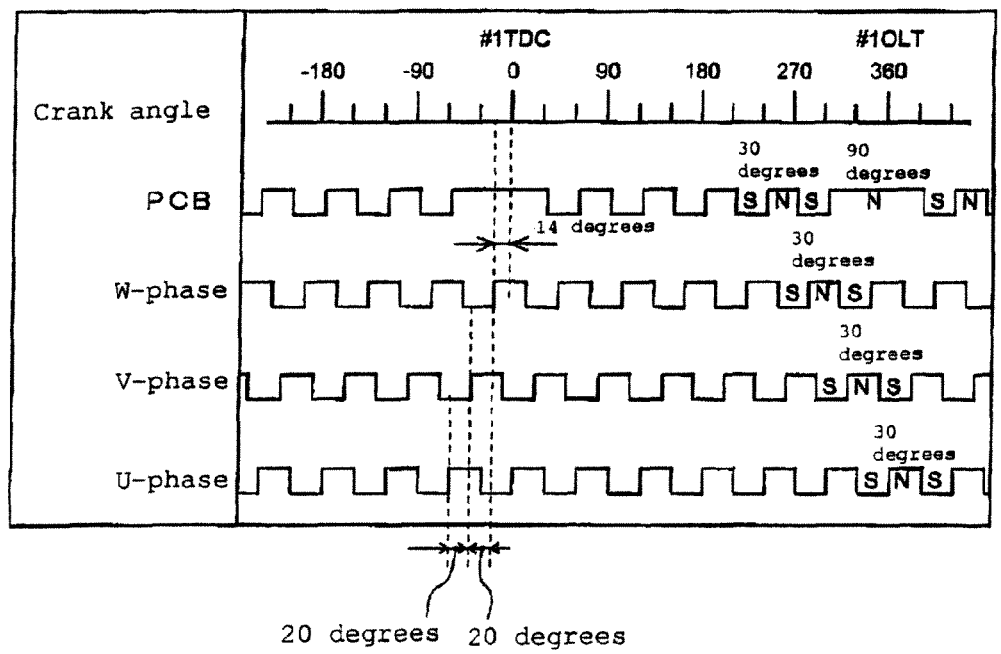
FIG. 5 is a diagram illustrating pulse signals detected by the motor angle sensor, in accordance with an embodiment of the invention.

FIG. 4 is a front view of the motor angle sensor 29, in accordance with an embodiment of the invention. FIG. 5 is a diagram illustrating pulse signals detected by the motor angle sensor 29, in accordance with an embodiment of the invention. As illustrated in FIG. 4, a rotor 50 secured to the crankshaft 51 for synchronous rotation can be configured to superimpose a first magnet rotor 52a on a second magnet rotor 52b. The first magnet rotor 52a can include a total of twelve magnets circularly arranged to output a 30-degree-width signal at 30-degree intervals. The second magnet rotor 52b can include a 90-degree-width magnet (the others are arranged at 30-degree intervals) located at only one position to fix the reference position of the rotor 50.

The motor angle sensor 29 can be provided with a U-phase hole IC 29C, a V-phase hole IC 29d and a W-phase hole IC 29a configured to detect U, V and W phases, respectively, using the first magnet rotor 52a, and further provided with a PCB hole IC 29b configured to detect output pulses including a tooth-missing portion using the second magnet rotor 52b. The hole ICs 29a, 29c, 29d can be arranged so that the W-phase, the U-phase and the V-phase are offset from one another every 10 degrees. In this way, the rotational angle of the crankshaft 51 can be detected every 10 degrees. The W-phase hole IC 29a can be disposed at a position turned counterclockwise by 120 degrees from the reference angle A illustrated in the figure and reversely turned by 10 degrees from the location of the PCB hole IC 29b. The PCB hole IC 29b can be disposed at a position reversely turned by 20 degrees from a vertical reference line illustrated in the figure (the position turned counterclockwise by 110 degrees from the reference angle A illustrated in the figure).

With reference to FIG. 5, it is set that the tooth-missing portion of the second magnet rotor 52b and the rotor output of the W-phase (a projecting portion of a pulse signal) can overlap the position of the top dead center (TDC: compression top dead center and OLT: overlap top) of the piston. Thus, the output of the W-phase can become a criterion to detect a crank rotation angle. A rising portion of a pulse signal of the W-phase overlapping the position of top dead center can be set at a position reversely offset by 14 degrees from top dead center (0 degrees and 360 degrees in crank angle).

Figure 6:
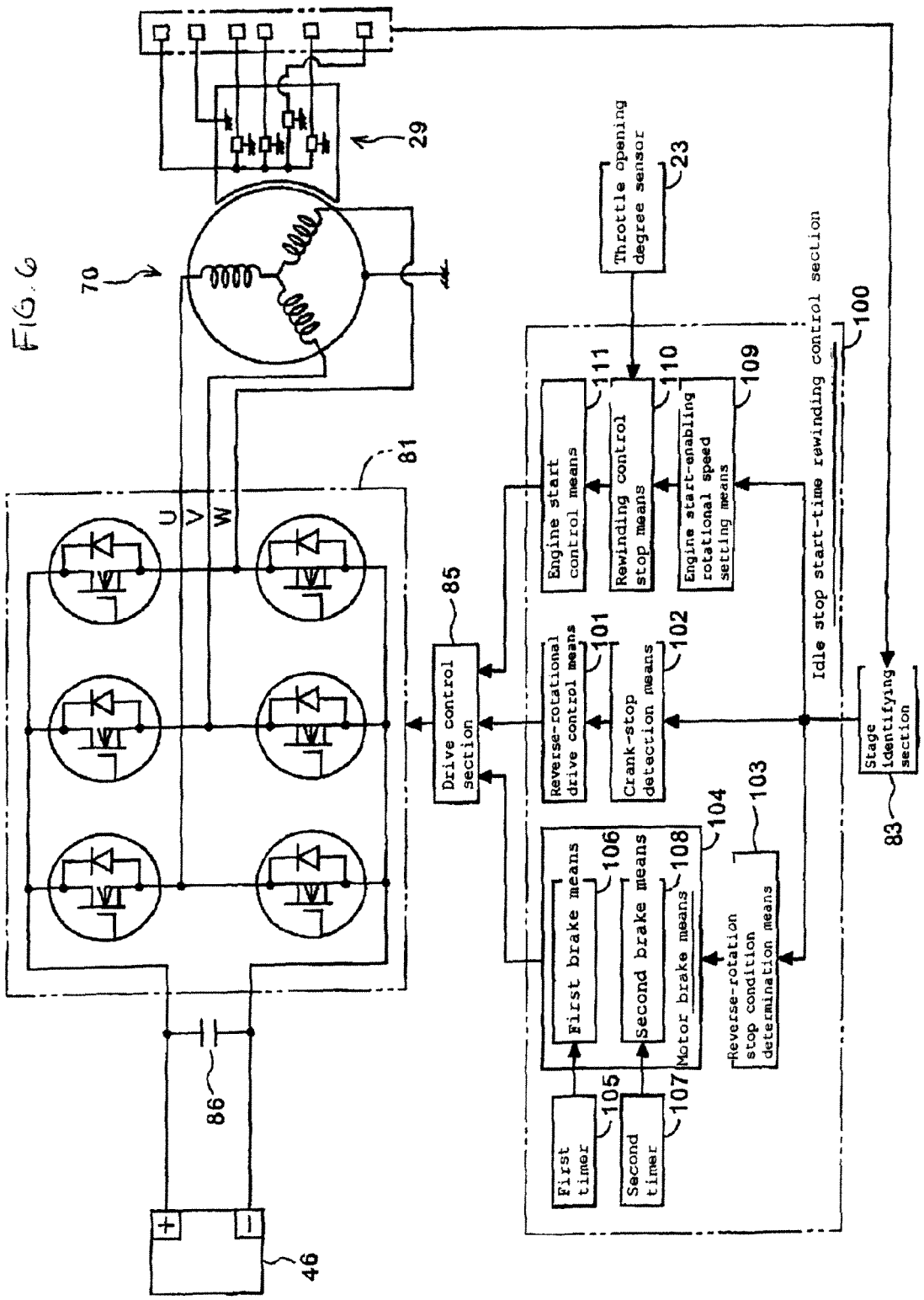
FIG. 6 is a block diagram illustrating a configuration of a major portion in an electronic control unit (ECU) relating to the ACG starter motor drive control, in accordance with an embodiment of the invention.

FIG. 6 is a block diagram illustrating a configuration of a major portion in the ECU 80 relating to the drive control of the ACG starter motor 70, in accordance with an embodiment of the invention. The full-wave rectifying bridge circuit 81 can be configured to connect in parallel three sets of two power FETs connected in series to each other. A smoothing condenser 86 can be disposed between the battery 46 and the full-wave rectifying bridge circuit 81.

A stage identifying unit 83 can divide two rotations of the crankshaft 51 into 72 stages (720-degree motor stage) of stages #0 through 71 and can identify a current stage based on the output signals of the motor angle sensor 29. Incidentally, the stage identification can be performed by a 360-degree motor stage, whereby one rotation of the crankshaft 51 is divided into 36 stages of stages #0 to 35, during the period from the start-up of the engine to the completion of stroke identification (i.e., dual determination of two rotations of the crankshaft 51) based on the output value of a PB sensor.

Incidentally, a control signal from the swing-back control unit 90 described earlier can be supplied to the drive control unit 85 driving the full-wave rectifying circuit 81. However, the figure depicts only the idle stop start-time rewinding control unit 100 because the idle stop start-time rewinding control relating to another embodiment of the invention is described below in detail.

The engine E may be started by operating the starter switch 35, i.e., started from the complete stop state. In such a case, the drive control unit 85 can supply a drive pulse of a swing-back reverse-rotation duty ratio (e.g., 100%) set by the swing-back control unit 90 to the power FETs of the full-wave rectifying bridge circuit 81 for reversely rotating the ACG starter motor 70. On the other hand, the engine E may be restarted by throttle operation from the idle stop state. In such a case, the drive control unit 85 can supply a drive pulse of a rewinding reverse-rotation duty ratio (e.g., 100%, such a ratio may be also between 90% and 100%) set by the idle stop start-time rewinding control unit 100 to the power FETs of the full-wave rectifying bridge circuit 81 for reversely rotating the ACG starter motor 70.

The idle stop start-time rewinding control unit 100 can be provided with a reverse-rotational drive controller 101 and a crank-stop detector 102. The crank-stop detector 102 can detect that the rotation of the crankshaft is stopped when the idle stop conditions are satisfied and the engine is to be stopped. The reverse-rotational drive controller 102 can issue a reverse-rotational drive command based on the rewinding reverse-rotation duty ratio to the drive control unit 85 along with the stop detected by the crank-stop detector 102.

The idle stop start-time rewinding control unit 100 is provided with reverse-rotation stop condition processor 103 and motor brake controller 104. The motor brake controller 104 can include a first brake controller 106 and a second brake controller 108. An output signal of the first timer 105 can be supplied to the first brake controller 106. An output signal of a second timer 107 is supplied to the second brake controller 108.

The reverse-rotation stop condition processor 103 can determine whether or not the reverse-rotation stop condition is satisfied during the implementation of the rewinding control based on the rewinding reverse-rotation duty ratio. The reverse-rotation stop condition can be a condition used to determine whether or not the crankshaft 51 is rewound to a predetermined position suitable for restart. In an embodiment of the invention, the condition can correspond to a compression reactive force, which is increased as the compression top dead center is approached, that can push back the piston so that the crankshaft 51 is turned from a reverse-rotation to a normal-rotation. Incidentally, the reverse-rotation stop condition may be set such that the compression reactive force brings reverse-rotational drive speed below a given value.

As described above, during the idle stop start-time rewinding control, "swing-back" can occur in which as the crankshaft 51 approaches the compression top dead center, the compression reactive force of the piston can be increased to push back the piston so that the crankshaft is rotated in the normal-rotational direction. The motor brake controller 104 can include a capability to apply a braking force to the crankshaft 51 and stop it at an appropriate position by driving the ACG starter motor 70 at a predetermined reverse-rotation duty ratio to reduce the amount of displacement in the normal-rotational direction resulting from "the swing-back."

In particular, the engine start control system according to an embodiment of the invention provides a motor brake control at the time of "the swing-back" that can be operated at the two kinds of duty ratios. Specifically, the first brake controller 106 can execute reverse-rotational drive at a first brake duty ratio (e.g., 70%) for a first predetermined period of time (T1) measured by the first timer 105. Subsequently, the second brake controller 108 can execute the reverse-rotational drive at a second brake duty ratio (e.g., 20%) for a second predetermined period of time (T2) measured by the second timer 107. In some embodiment of the invention, the first and second predetermined period of times may be measured by a single timer.

Although details will be described later, this two-stage motor brake control can stop the crankshaft 51 at an appropriate position in a short time even when "the swing-back" is large. It is possible, therefore, to shorten the time taken to complete the rewinding control by setting the rewinding reverse-rotation duty ratio at a large value to increase reverse-rotation speed.

Further, the idle stop start-time rewinding control unit 100 can include a engine start-enabling rotational speed setting unit 109, a rewinding control stop unit 110, and an engine start controller 111. In an embodiment of the invention, even during the reverse-rotational drive at the rewinding reverse-rotation duty ratio, when it is detected that the reverse-rotation speed falls below the predetermined value and the throttle opening degree is not less than a predetermined value, the rewinding control can be stopped and switched to the normal-rotational drive to start the engine. The engine start-enabling rotational speed setting unit 109 can set a predetermined value of reverse-rotation speed (e.g., −100 rpm), which is one of the permission conditions for switching to the normal-rotational drive.

During the reverse-rotational drive based on the rewinding reverse-rotation duty ratio, the reverse-rotation speed may fall below a predetermined speed due to the compression reactive force and the throttle opening degree may become not less than the predetermined value. In such a case, the rewinding control stop unit 110 can stop the rewinding control and can transmit, to the engine start controller 111, a message to switch the reverse-rotational drive to the normal-rotational drive. Upon receipt of the drive signal from the rewinding control stop unit 110, the engine start controller 111 can output a control signal to the drive controller 85 to normal-rotational drive the ACG starter motor 70 at an engine start normal-rotational duty ratio (e.g., 100%).

According to the normal-rotational switching control as described above, an occupant can perform throttle operation to start moving during reverse-rotational drive at the time of starting the idle stop control. In this case, it is possible to shorten the time taken to restart the engine from the start of the throttle operation as compared to waiting until the rewinding control has fully been completed, before the reverse-rotational drive is switched to the normal-rotational drive. Thus, it is possible to shorten the time taken to start the vehicle after the throttle operation has been done.

Figure 7:
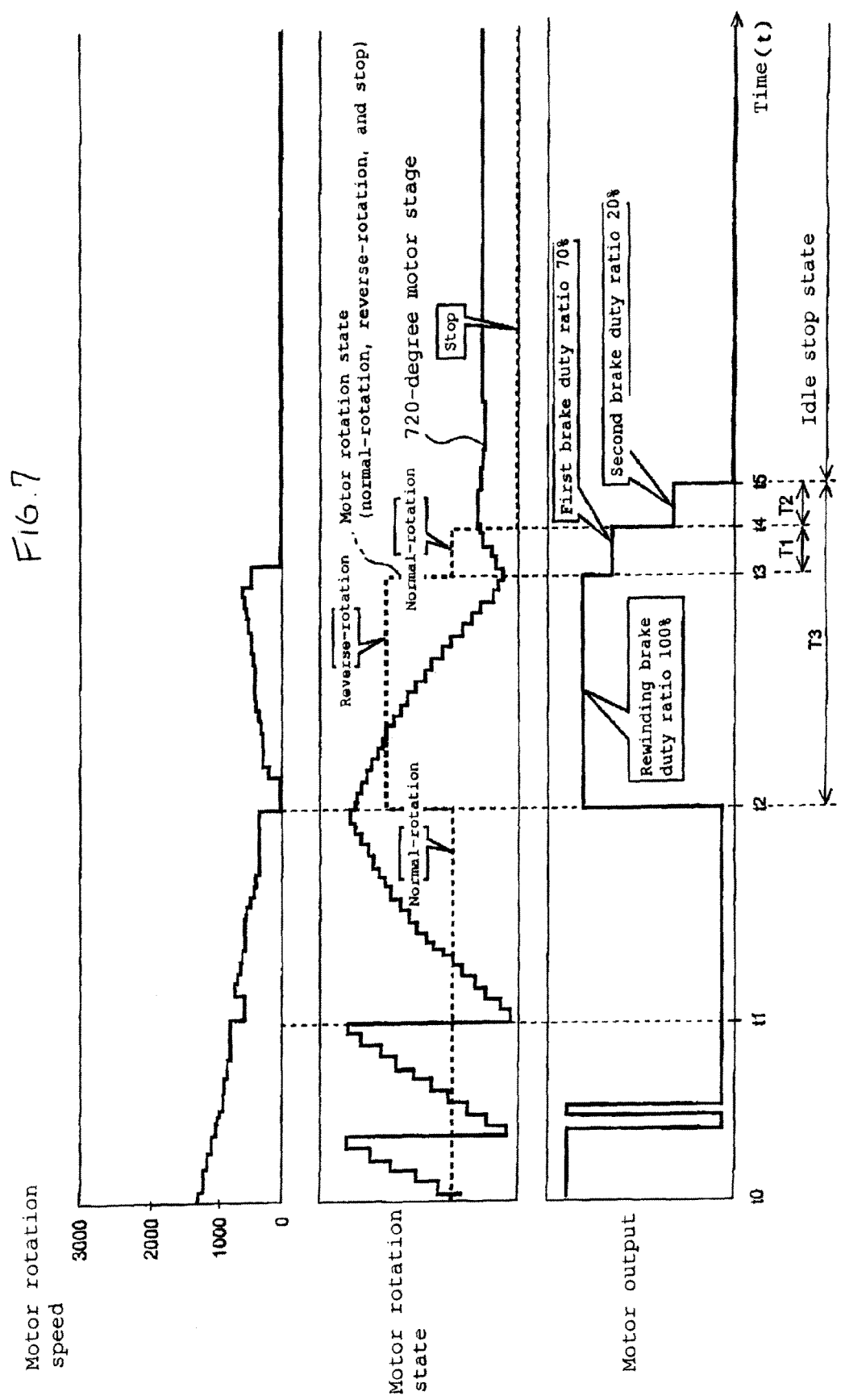
FIG. 7 is a time chart illustrating a flow of the idle stop start-time rewinding control, in accordance with an embodiment of the invention.

FIG. 7 is a time chart illustrating a flow of the idle stop start-time rewinding control, in accordance with an embodiment of the invention. FIG. 7 illustrates motor rotation speed, motor rotation states and motor output in order from above. At time t1, the idle stop conditions, as previously described, can be satisfied and the idle stop control can be started. Thereafter, at time T2, if the stop of the crankshaft 51 is detected, the rewinding control can be started at a rewinding duty ratio (e.g., 100%).

At time t3, the crankshaft 51 can come close to the compression top dead center in the reverse-rotational direction to increase the compression reactive force of the piston. Thus, the piston can be pushed back in the state where the reverse-rotation energization is continued at the rewinding duty ratio (e.g., 100%), so that the crankshaft 51 is turned into the normal-rotation. In other words, "the swing-back" of the crankshaft 51 can be started. When detecting that the crankshaft is turned into the normal-rotation based on the output signal of the motor angle sensor 29, the idle stop start-time rewinding control unit 100 can determine that the crankshaft 51 detects the predetermined position, and can switch the energization of the ACG starter motor 70 into the motor brake control of the first stage.

In the motor brake control of the first stage started at time t3, the first brake duty ratio (e.g., 70%) can be given by the first brake controller 106 and at the same time the first timer 105 can start to measure a first predetermined period of time T1 (e.g., 0.1 second). Next, at time t4, the motor brake control of the second stage can be started after the elapse of the first predetermined period of time T1. In the motor brake control of the second stage, the second brake duty ratio (e.g., 20%) can be given by the second brake controller 108 and at the same time the second timer 107 can start to measure a second predetermined period of time T2 (e.g., 0.1 second). At time t5, after the elapse of the second predetermined period of time T2 measured by the second timer 107, the reverse-rotation energization to the ACG starter motor 70 can be ended and can move into the idle stop state. Incidentally, the first brake duty ratio may be set at any value equal to or more than 50% and the second brake duty ratio may be set at any value equal to or less than 50%.

According to the motor brake control of the two-stage described above, "the swing-back" of the crankshaft can be allowed to converge in a short time by the two kinds of motor brakes: first strong braking and second weak braking. Therefore, the rewinding motor duty ratio can be set at a value as large as 100%. Thus, it is possible to shorten a period of time T3 from rewinding control start time t2 to rewinding control completion time t5. The effect of shortening the period of time to the completion of the rewinding control is about half (e.g., 0.5 second) of the traditional method. Incidentally, the rewinding motor duty ratio may be set at any value between 90% and 100%. Thus, excessive rewinding can be prevented during the rewinding control.

The stop position of the reverse-rotational drive and the start position of the first and second brake control based on the rewinding duty ratios can be detected based on a variation in transit speed of the 720-degree motor stage in which two rotations of the crankshaft 51 are equally divided by the 72 motor stages or that the 720-degree motor stage reaches a predetermined stage.

Figure 8:
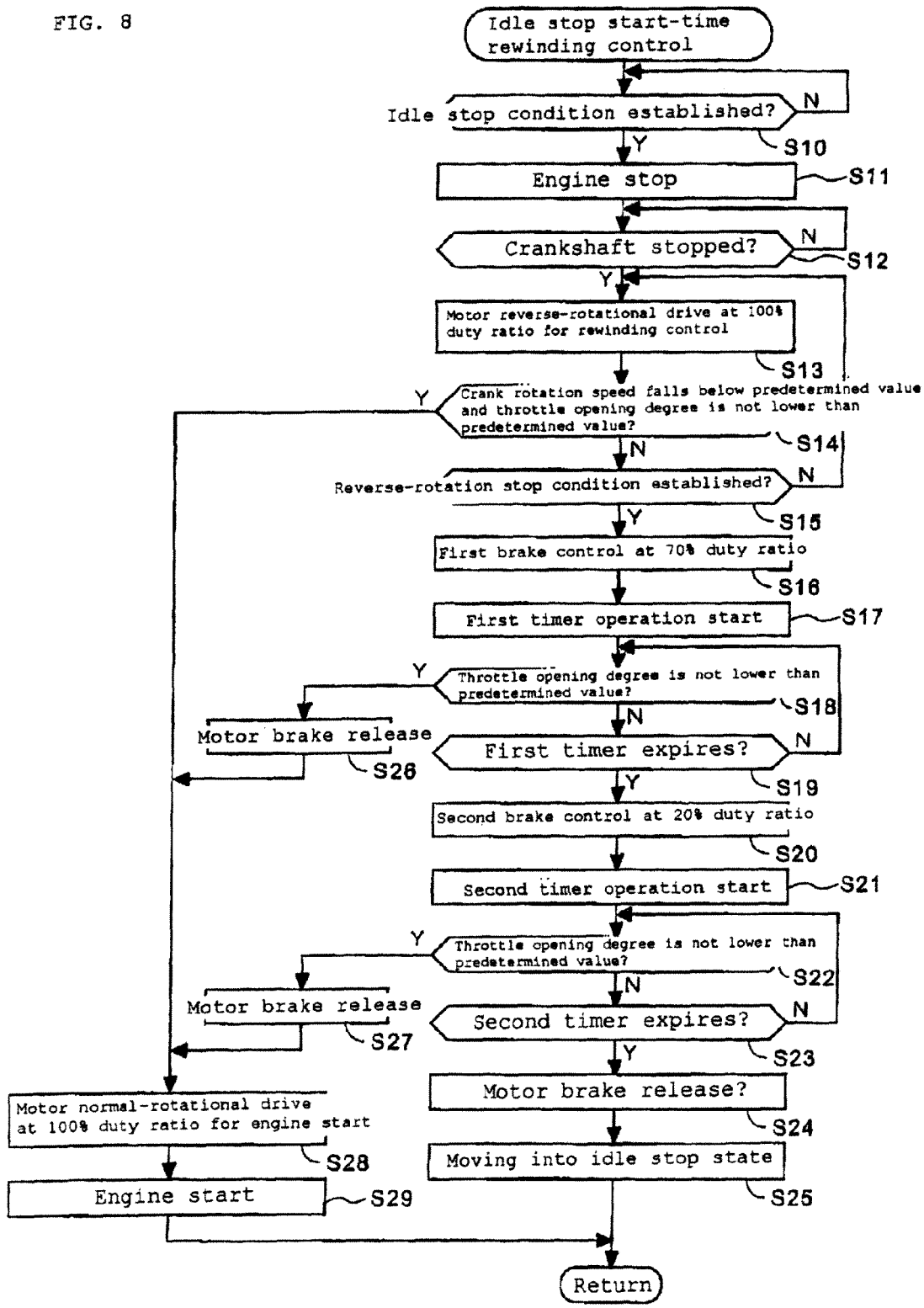
FIG. 8 is a flowchart illustrating a procedure for the idle stop start-time rewinding control, in accordance with an embodiment of the invention.

FIG. 8 is a flowchart illustrating a procedure for the idle stop start-time rewinding control, in accordance with an embodiment of the invention. This flowchart illustrates processing when the throttle operation is performed before moving into the idle stop state, and further illustrates a procedure for the two-stage motor brake control described above. In step S10, a determination can made whether or not the idle stop conditions are established. If the affirmative determination is made, the control can proceed to step S11, whereby the stop processing of the engine E can be performed. Incidentally, if a negative determination is made in step S10, the control can be returned to the determination of step S10.

In subsequent step S12, a determination can be made whether or not the rotation of the crankshaft 51 is stopped based on the output signal of the motor angle sensor 29. If a negative determination is made in step S12, the control can return to the determination of step S12. On the other hand, if an affirmative determination is made, the control can proceed to step S13, in which the reverse-rotational drive is started on the rewinding control duty ratio (e.g., 100%).

Next, in step S14, a determination can be made whether or not to detect that the crank rotation speed falls below the predetermined value and that the throttle opening degree is not lower than the predetermined value. If a negative determination is made in step S14, the control can proceed to step S15. If an affirmative determination is made, the control can proceed to step 28, in which the ACG starter motor 70 can be normal-rotationally driven at an engine start duty ratio (e.g., 100%) to restart the engine. In step S29, the engine can be started by the normal-rotational drive. Then, the series of control can be ended without moving into the idle stop state.

In step S15, a determination can be made whether or not the reverse-rotation stop condition is established. In step S15, if an affirmative determination is made, i.e., if it is determined that the reverse-rotation stop condition is established by the compression reactive force pushing back the piston to shift the crankshaft from the reverse-rotation to the normal-rotation, the control can proceed to step S16. In step S16, the first brake control can be started at the first brake duty ratio (e.g., 70%) by the first brake controller 106. In subsequent step S17, the first timer 105 can operatively start to measure the implementation time of the first brake control.

Next, in step S18, a determination can be made whether or not the throttle opening degree is not lower than the predetermined value. In step S18, if an affirmative determination is made, i.e., if it is determined that the throttle operation is performed during the implementation of the first brake control to allow "the swing-back" to converge, the control can proceed to step S26, in which the motor brake at the first brake duty ratio can be released. After the release of the motor brake, similarly to the affirmative determination of step S14, the engine can be restarted in steps S28 and S29, and then the series of control can be ended.

On the other hand, if a negative determination is made in step S18, the control can proceed to step S19, in which a determination is made whether or not the first timer 105 expires. If an affirmative determination is made in step S19, the control can proceed to step S20, in which the second brake control is started at the second brake duty ratio (e.g., 20%) by the second brake controller 107. In subsequent step S21, the operation of the second timer 107 can be started to measure the implementation time of the second brake control.

Next, in step S22, a determination can be made whether the throttle opening degree is not lower than the predetermined value. In step S22, if an affirmative determination is made, i.e., if it is determined that the throttle operation is performed during the implementation of the second brake control, the control can proceed to step S26, in which the motor brake can be released. After the release of the motor brake, similarly to the affirmative determination in step S14 or S18, the engine can be restarted in steps S28 and S29. Then the series of control can be ended.

If a negative determination is made in step S22, the control can proceed to step S23, in which a determination is made whether or not the second timer 107 expires. If an affirmative determination is made in step S23, the control can proceed to step S24, in which the motor brake at the second brake duty ratio can be released. In step S25, the engine can be shifted to the idle stop state.

The overall flow of the rewinding control is described with reference to the flowchart of FIG. 8. The rewinding control, the detection processing of the reverse-rotation stop condition, the determination processing of the reverse-rotation duty, etc., are described in detail with reference to flowcharts of FIGS. 9 to 15.

Figure 9:
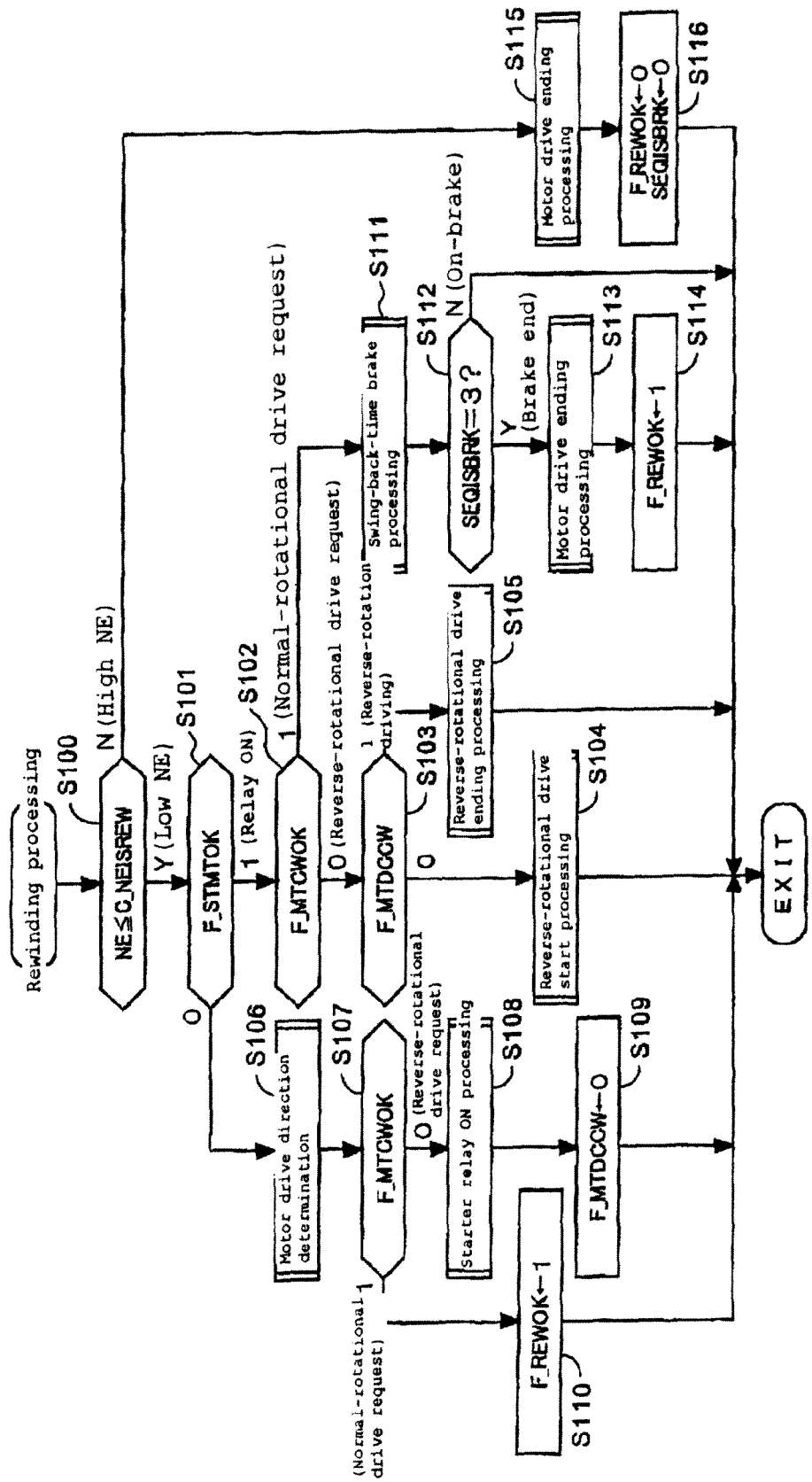
FIG. 9 is a flowchart illustrating a specific procedure for rewinding processing, in accordance with an embodiment of the invention.

FIG. 9 is a flowchart illustrating a specific procedure for the rewinding processing (the rewinding control), in accordance with an embodiment of the invention. In step S100, a determination can be made whether or not engine speed (NE) falls below rewinding permission engine speed (C_NEISREW). If an affirmative determination is made in step S100, the control can proceed to step S101.

On the other hand, if a negative determination is made in step S100, the control can proceed to step S115, whereby processing of the motor drive can be ended, and can proceed to step S116. In step S166, a rewinding processing flag (F_REWOK) and a motor brake mode (SEQISBRK) can each be set to 0 and the series of control can be ended. Incidentally, the brake mode can include four modes in all: modes 0, 1, 2, and 3. Mode 0 corresponds to non-application of brake, mode 1 corresponds to "under implementation of the first brake control," mode 2 corresponds to "under implementation of the second brake control" and mode 3 corresponds to "end of the brake control."

In step S101, a determination can be made whether a starter motor flag (F_STMTOK) is either 1 or 0. If it is determined that the starter motor flag is 1, i.e., a starter motor relay is ON, the control can proceed to step S102. In step S102, a determination can be made whether a motor drive request flag (F_MTCWOK) is either 1 or 0. If the motor drive request flag is 0, it can be determined that the reverse-rotational drive request is present and the control can proceed to step S103.

In step S103, a determination can be made whether a reverse-rotational drive flag (F_MTDCCW) is either 0 or 1. In step S103, if it is determined that the reverse-rotational drive flag is 0, i.e., the reverse-rotational drive is not being done (the normal-rotation or stop state), the control can proceed to step S104, in which reverse-rotational drive start processing can be implemented. Then, the series of control can be ended. On the other hand, in step S103, if it is determined that the reverse-rotational drive flag is 1, i.e., the reverse-rotational drive is being done, reverse-rotational drive ending determination can be executed in step S105 and then the series of control can be ended.

Returning to the determination of step S101, if it is determined that the starter motor flag (F_STMTOK) is 0 in step S101, the control can proceed to step S106, in which a motor drive direction determination can be executed. In subsequent step S107, similarly to step S102, a determination can be made whether the motor drive request flag (F_MTCWOK) is either 1 or 0. If the motor drive request flag is 0, it can be determined that reverse-rotation request is present and the control can proceed to step S108.

Starter relay ON-processing can be executed in step S108 and the reverse-rotational drive flag (F_MTDCCW) can be set to 0 in step S109. Then, the series of control can be ended. On the other hand, if it is determined in step S107 that the motor drive request flag is 1, i.e., that the normal-rotational drive request is present, a rewinding processing flag (F_REWOK) can be set to 1. Then, the series of control can be ended.

Returning to the determination of step S102, if it is determined in step S102 that the motor drive request flag (F_MTCWOK) is 1, i.e., that the normal-rotational drive request is present, the control can proceed to step S111, in which the swing-back-time brake processing can be executed. In subsequent step S112, a determination can be made whether or not the brake mode (SEQISBRK) is 3. In step S112 if an affirmative determination is made, i.e., if it is determined that the brake control is ended, the control can proceed to step S113. In step S113, the motor drive ending processing is performed. In step S114, the rewinding processing flag (F_REWOK) can be set to 1. Then, the series of control can be ended. On the other hand, in step S112, if is determined that brake mode is not 3, the control can be ended as it is.

Figure 10:
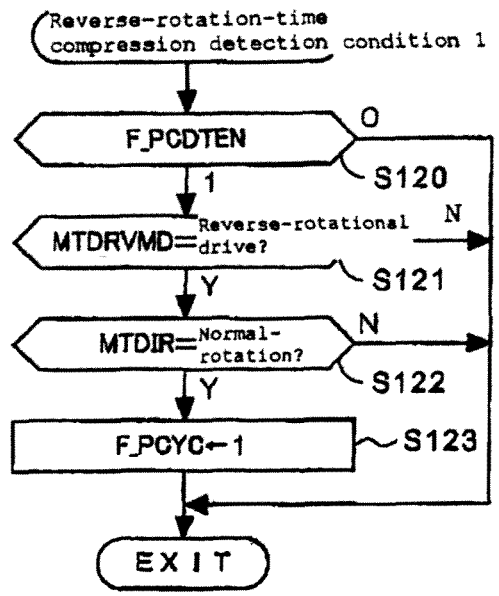
FIG. 10 is a flowchart illustrating a procedure in which a reverse-rotation-time compression detection condition 1 is satisfied, in accordance with an embodiment of the invention.

FIG. 10 is a flowchart illustrating a procedure in which a reverse-rotation-time compression detection condition 1 is satisfied, in accordance with an embodiment of the invention. The reverse-rotation-time compression detection condition 1 is the same as the above-described reverse-rotation stop condition (see FIG. 8). The flowchart in FIG. 10 illustrates a procedure for how to detect that the crankshaft is turned from the reverse-rotation into the normal-rotation. First, in step S120, a determination can be made whether a reverse-rotation-time compression detection permission flag (F_PCDTEN) is either 1 or 0. If it is determined that the reverse-rotation-time compression detection permission flag is 1, the control can proceed to step S121.

In step S121, a determination can be made whether or not the motor drive mode (MTDRVMD) is a reverse-rotational drive mode. In step S121, if an affirmative determination is made, the control can proceed to step S122, in which a determination can be made whether or not the motor-rotational direction (MTDIR) is normal-rotation. Incidentally, three modes in total (mode 0: stop, mode 1: normal-rotation, and mode 2: reverse-rotation) can be set in the motor-rotational direction (MTDIR).

If an affirmative determination is made in step S122, the control can proceed to step S123, in which a reverse-rotation-time compression detection flag (F_PCYC) is set to 1, i.e., it can be determined that the crankshaft is reverse-rotationally driven to a predetermined position. Then, the series of control can be ended. Incidentally, if it is determined that the reverse-rotation-time compression detection permission flag is 0 in step S120 or a negative determination is made in step S121 or S122, the series of control can be ended.

Figure 11:
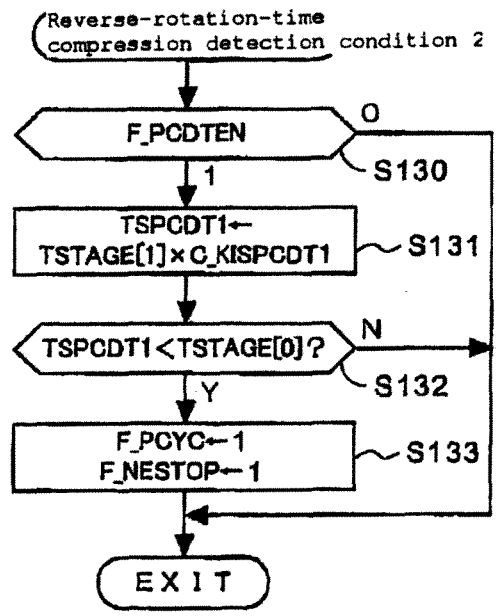
FIG. 11 is a flowchart illustrating a procedure in which a reverse-rotation-time compression detection condition 2 is satisfied, in accordance with an embodiment of the invention.

FIG. 11 is a flowchart illustrating a procedure in which a reverse-rotation-time compression detection condition 2 is satisfied, in accordance with an embodiment of the invention. According to a reverse-rotation compression detection condition 2, it can be determined that the crankshaft is rewound to the predetermined position when the compression reactive force allows the reverse-rotation speed of the crankshaft to fall below a predetermined value. First, in step S130, a determination can be made as to whether a reverse-rotation-time compression detection permission flag (F_PCDTEN) is either 1 or 0. If it is determined that the reverse-rotation-time compression detection flag is 1, the control can proceed to step S131.

In step S131, a numerical value obtained by multiplying a previous measured value (TSTAGE[1]) of rotor-sensor-time by a multiple number for determination time calculation can be assigned to reverse-rotation-time compression detection determination time (TSPCDT1) as a variable. For example, the multiple number for determination time calculation can be set to e.g., 3. In step S132, a determination can be made whether or not the current measured value (TSTAGE[0]) of rotor-sensor-time exceeds the reverse-rotation-time compression detection determination time (TSPCDT1).

In step S132, if an affirmative determination is made, i.e., if it is determined that the current measured value of rotor-sensor-time exceeds the previous measured value by three times, the control can proceed to step S133. In step S133, when it is determined that the crankshaft is rewound to the predetermined position, a reverse-rotation-time compression detection flag (F_PCYC) and an NE30 clear flag (F_NESTOP) based on the reverse-rotation-time compression detection can each be set to 1. Then, the series of control can be ended. If it is determined that the reverse-rotation-time compression detection permission flag is 0 in step S130, or if a negative determination is made in the determination of step S132, the series of control can be ended. Incidentally, NE30 can be a measured value corresponding to the rotation speed of the crankshaft.

Figure 12:
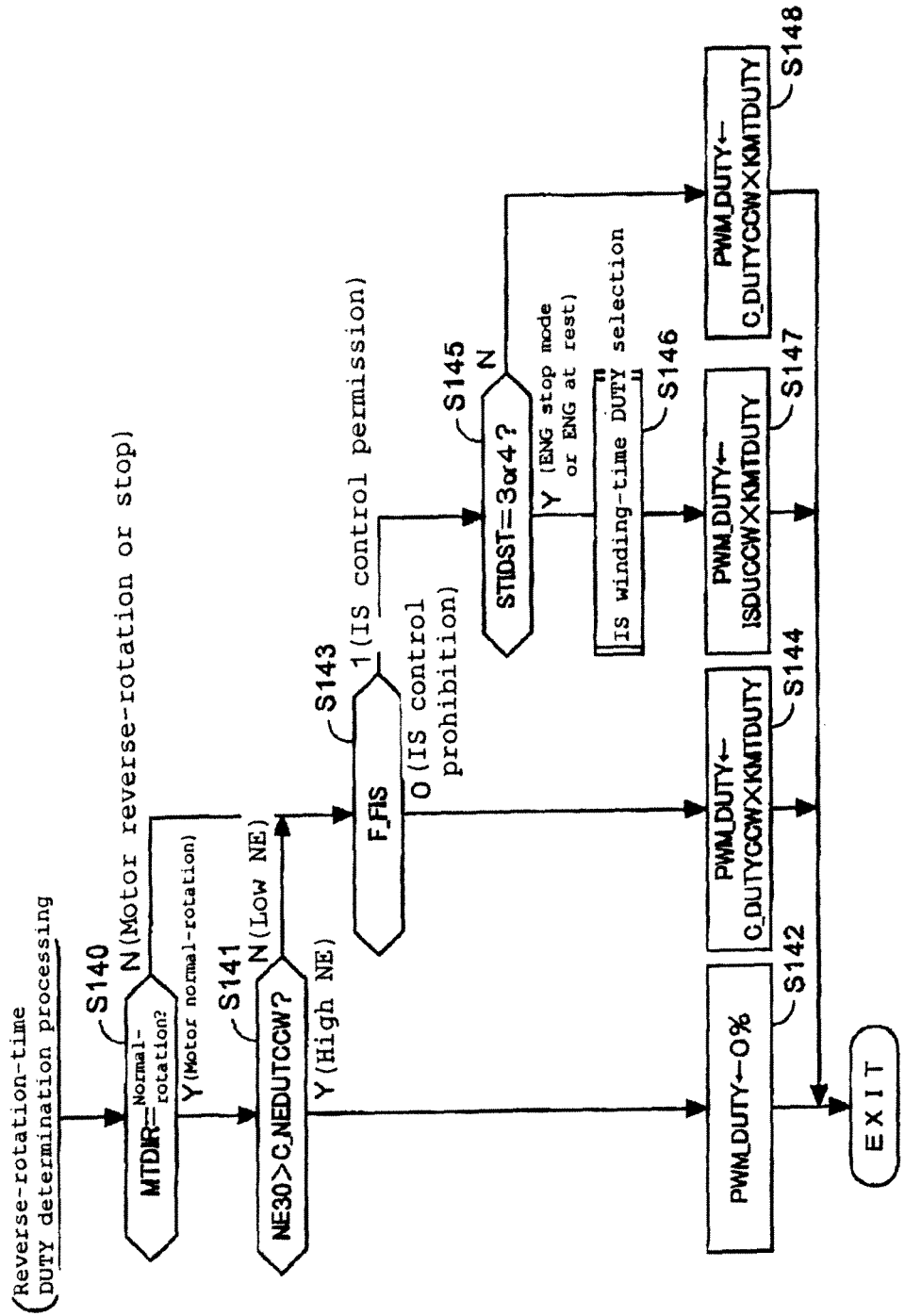
FIG. 12 is a flowchart illustrating a procedure for reverse-rotational drive-time duty determination processing, in accordance with an embodiment of the invention.

FIG. 12 is a flowchart illustrating a procedure for reverse-rotation-time duty (DUTY) determination processing, in accordance with an embodiment of the invention. First, in step S140, a determination can be made whether or not a motor-rotational direction (MTDIR) is normal-rotation. If an affirmative determination is made in step S140, the control can proceed to step S141, in which a determination can be made whether or not the rotation speed NE30 of the crankshaft exceeds a predetermined value (C_NEDUTCCW). If an affirmative determination is made in step S141, the control can proceed to step S142, in which a motor duty ratio (PWM_DUTY) can be set to 0%. Then, the series of control can be ended.

On the other hand, if a negative determination is made in step S140 or S141, the control can proceed to step S143. In step S143, a determination can be made whether an idle stop permission flag (F_FIS) is either 1 or 0. If it is determined that the idle stop permission flag is 0, i.e., that idle stop control (IS) is prohibited, the control can proceed to step S144. In step S144, the motor duty ratio (PWM_DUTY) can be set to a swing-back reverse-rotation duty ratio (C_DUTYCCW (swing-back coefficient)×KMTDUTY (a predetermined duty ratio), e.g. 100%). Then, the series of control can be ended.

In step S143, if is determined that the idle stop permission flag is 1, i.e., that the idle stop control is permitted, the control can proceed to step S145. In step S145, a determination can be made whether or not an idle stop stage (STIDST) is 3: engine (ENG) stop mode, or 4: engine (ENG) being at rest.

If an affirmative determination is made in step S145, the control can proceed to step S146 and idle stop (IS) winding-time duty (DUTY) selection can be executed. In subsequent step S147, the motor duty ratio (PWM_DUTY) can be set to a rewinding reverse-rotation duty ratio (ISDUCCW (rewinding coefficient)×KMTDUTY (a predetermined duty ratio), e.g., 100%). Then, the series of control can be ended.

On the other hand, if a negative determination is made in step S145, the control can proceed to step S148, in which the motor duty ratio (PWM_DUTY) can be set to a swing-back reverse-rotation duty ratio (C_DUTYCCW (swing-back coefficient)×KMTDUTY (a predetermined duty ratio), e.g. 100%). Then, the series of control can be ended.

Figure 13:
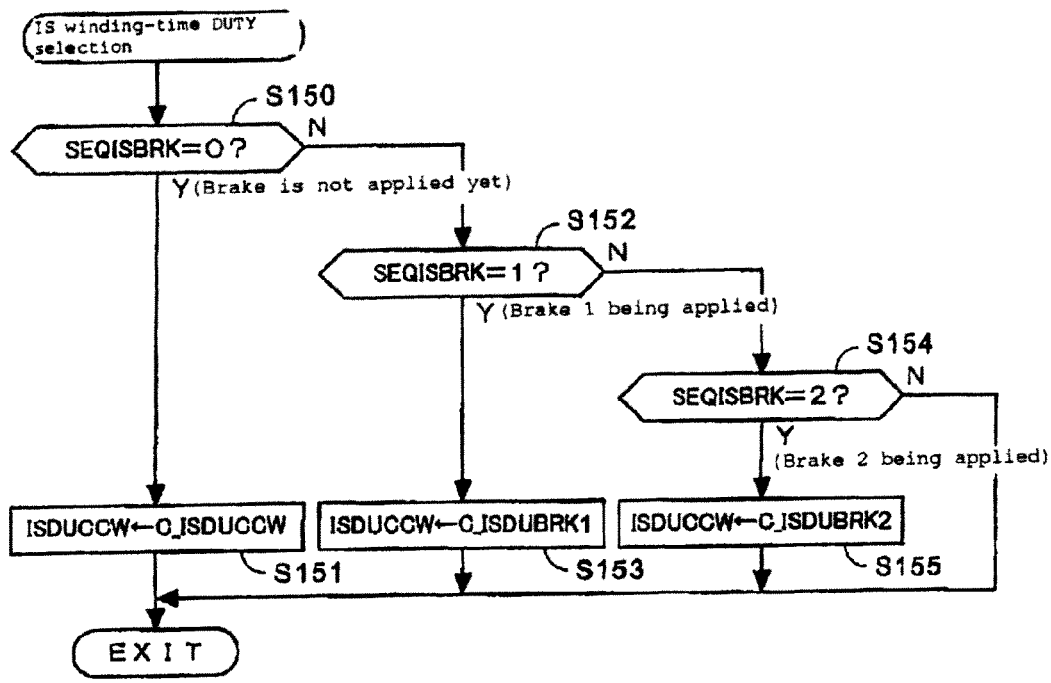
FIG. 13 is a flowchart illustrating details of idle stop winding-time duty selection processing, in accordance with an embodiment of the invention.

FIG. 13 is a flowchart illustrating details of idle stop (IS) winding-time duty (DUTY) selection processing, in accordance with an embodiment of the invention. This processing corresponds to step S146 of the flowchart of FIG. 13. In step S150, a determination can be made whether or not a brake mode (SEQISBRK) is 0. If an affirmative determination is made in step S150, i.e., if it is determined that the motor brake control is not applied yet, the control can proceed to step S151. In step S151, an idle stop counter (ISDUCCW) can be set to an initial value (C_ISDUCCW). Then, the series of control can be ended.

If a negative determination is made in step S150, i.e., if it is determined that brake is applied, the control can proceed to step S152. In step S152, a determination can be made whether or not the brake mode is 1. If an affirmative determination is made in step S152, i.e., if it is determined that brake 1 (first brake control) is being applied, the control can proceed to step S153. In step S153, the measurement of first predetermined time T1 (C_ISDUBRK1) can be started by an idle stop counter.

If a negative determination is made in step S152, the control can proceed to step S154, in which a determination can be made whether or not the brake mode is 2. In step S154, if an affirmative determination is made, i.e., if it is determined that brake 2 (second brake control) is being applied, the control can proceed to step S155. In step S155, the measurement of second predetermined time T2 (C_ISDUBRK1) can be started by the idle stop counter. Incidentally, if a negative determination is made in step S154, the control can be ended as it is.

Figure 14:
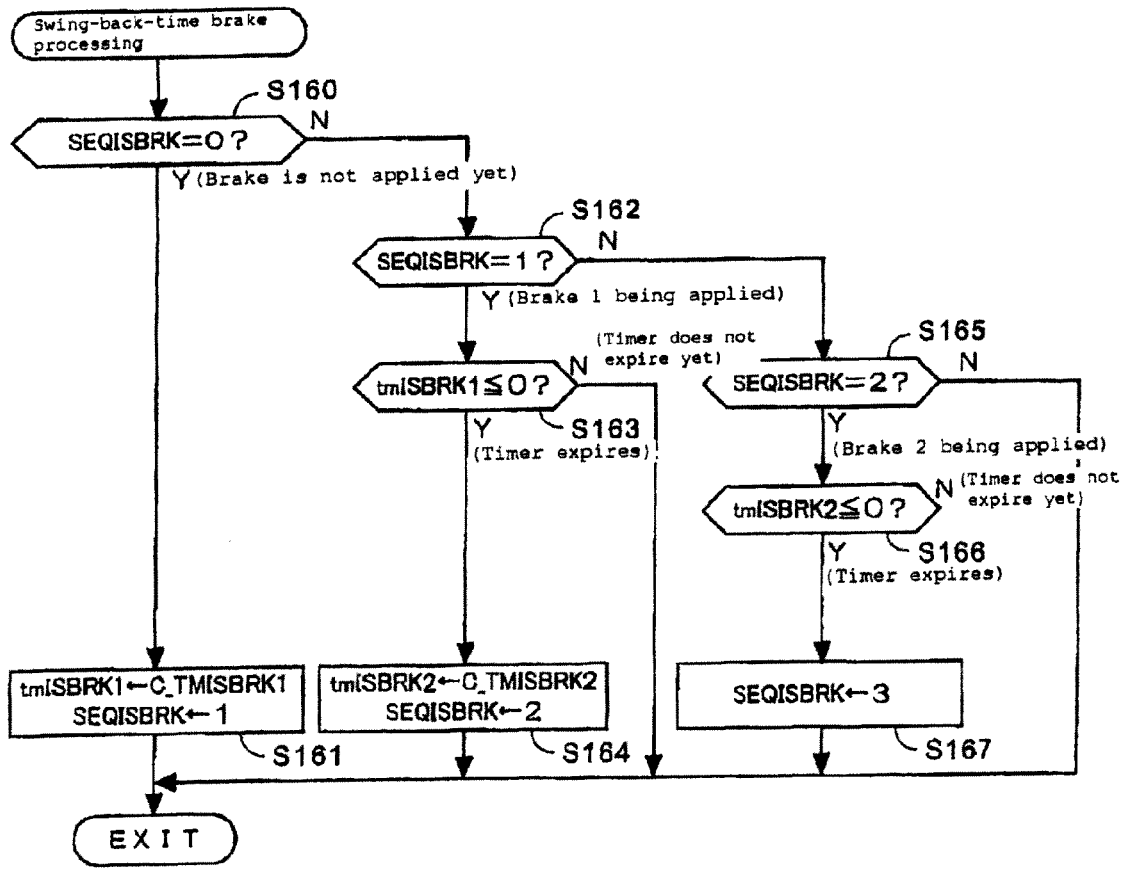
FIG. 14 is a flowchart illustrating a procedure for swing-back-time brake processing, in accordance with an embodiment of the invention.

FIG. 14 is a flowchart illustrating a procedure for swing-back-time brake processing, in accordance with an embodiment of the invention. This swing-back-time brake processing corresponds to step S111 of the flowchart illustrated in FIG. 9. First, in step S160, a determination can be made whether or not the brake mode (SEQISBRK) is 0. In step S160, if an affirmative determination is made, i.e., if it is determined that the motor brake control is not applied yet, the control can proceed to step S161. In step S161, an expiring value (tmISBRK1) of the timer as a variable can be set to first predetermined time T1 (C_TMISBRK1), its measurement can be started, and the brake mode (SEQISBRK) can be set to 1. Then, the series of control can be ended.

If a negative determination is made in step S160, the control can proceed to step S162, in which a determination can be made whether or not the brake mode is 1. In step S162, if an affirmative determination is made, i.e., if it is determined that the first brake control is being applied, the control can proceed to step S163. In step S163, a determination can be made whether or not tmISBRK1 becomes equal to or smaller than 0. If an affirmative determination is made, i.e., if it is determined that the timer has expired and first predetermined time has lapsed, the control can proceed to step S164. In step S164, an expiring value (tmISBRK2) of the timer can be set to second predetermined time T2 (C_TMISBRK2), its measurement can be started, and the brake mode (SEQISBRK) can be set to 2. Then, the series of control can be ended.

In step S162, if a negative determination is made, the control can proceed to step S165, in which a determination can be made as to whether or not the brake mode is 2. In step S165, if an affirmative determination is made, i.e., if the second brake control is being applied, the control can proceed to step S166. In step S166, a determination can be made whether or not tmISBRK2 becomes equal to or smaller than 0. If an affirmative determination is made, i.e., if it is determined that the timer has expired and the second predetermined time has lapsed, the control can proceed to step S167. In step S167, the brake mode (SEQISBRK) can be set to 3 (brake control end). Then, the series of control can be ended.

FIG. 15 is a flowchart illustrating a procedure for idle stop (IS)-present engine (EN) stop mode processing, in accordance with an embodiment of the invention. In this processing, when the throttle opening degree becomes not less than a predetermined value of an idle stop start-time rewinding control, if a predetermined condition is met, the motor brake can be released. First, in step S170, a determination can be made whether a throttle open flag (F_ISTHOPN) is either 1 or 0. If it is determined that the throttle open flag (F_ISTHOPN) is 1, i.e., that the output value of the throttle (TH) sensor becomes not less than the predetermined value, the control can proceed to step S171.

In step S171, a determination can be made whether or not the crank rotation speed NE30 becomes not less than a predetermined value (MTDROKNE). In step S171, if an affirmative determination is made, i.e., if the negative rotation speed resulting from reverse-rotational drive reduces (comes close to a stop state) and the rotation speed becomes not less than the predetermined value (high-NE), the control can proceed to step S172. In step S172, the swing-back brake duty (DUTY) can be released.

In subsequent step S173, the idle stop stage (STIDST) can be set to 5, i.e., an idle stop (IS)-present engine (ENG) rotating stage is set. Then, the series of control can be ended. Incidentally, the IS-present ENG rotating stage is a stage corresponding to a case where the engine is running in the state capable of being shifted to idle stop if a predetermined condition is met. Here, the IS-present ENG rotating stage corresponds to a state where the motor brake can be released before the shifting to the idle stop state and the preparation of the engine restart can be completed.

On the other hand, in step S171, if a negative determination is made, it can be determined that since the reverse-rotation directional rotation speed is still large (low NE), timing of releasing the swing-back brake is not reached yet. The control can proceed to step S174. In step S174, a determination can be made whether or not the rewinding processing flag (R_REWOK) is 1 or 0. If it is determined that the rewinding processing flag (R_REWOK) is 1, i.e., that the rewinding processing has been completed, the control can proceed to step S175. In step S175, the idle stop stage (STIDST) can be set to 4, i.e., it is brought into the IS-present ENG stop stage. Then, the series of control can be ended. Incidentally, the IS-present engine stop stage is a synonym for the idle stop state.

As described above, according to the engine start control system of embodiments of the invention, in the idle stop start-time rewinding control, if it is detected that the crankshaft is rewound to a predetermined value by the reverse-rotational drive, the crankshaft can be braked by two-stage, first strong and second weak, braking. Therefore, "swing-back" resulting from a compression reactive force can be allowed to converge in a short time, which makes it possible to shorten time taken to complete the rewinding control.

Even during the execution of the motor brake control, switching to the normal-rotation for engine start can be achieved in response to throttle operation. Further, even for the reverse-rotational drive of the rewinding control, if the drive speed in the reverse-rotational direction is smaller than a predetermined value, switching to the normal-rotational drive can be achieved in response to the throttle operation. Thus, it is possible to shorten the time taken to restart the engine from the start of the throttle operation.

Incidentally, the shape and configuration of the ACG starter motor and of the motor angle sensor, the internal configuration of the ECU (the engine start control system), the reverse-rotational duty ratio applied to the idle stop start-time rewinding control, the set values of the first and second duty ratios, the implementation times of the first and second brake control, etc., are not limited to the embodiments described above. Various other modifications or alterations are possible as well. The reverse-rotational duty ratio can be set for every motor 720-degree stage. The duty can be set according to instant NE during reverse-rotation. The engine start control system according to the any embodiment of the invention, as previously described, can be applied to three-wheeled and four-wheeled vehicles, including motorcycles.

DESCRIPTION OF REFERENCE NUMERALS

1 . . . Motorcycle
29 . . . Motor angle sensor
51 . . . Crankshaft
70 . . . ACG starter motor (motor)
80 . . . ECU (engine start control system)
81 . . . Full-wave rectifying bridge circuit
90 . . . Swing-back control unit
100 . . . Idle stop start-time rewinding control unit
101 . . . Reverse-rotational drive controller
102 . . . Crank-stop detector
104 . . . Motor brake controller
105 . . . First timer
106 . . . First brake controller
107 . . . Second timer
108 . . . Second brake controller
109 . . . Engine start-enabling rotational speed setting unit
110 . . . Rewinding control stop unit
111 . . . Engine start controller

We claim:

1. An engine start control system, comprising:
a controller configured to perform an idle stop control to stop an engine based on an establishment of a condition; and
a motor configured to reverse-rotationally drive a crankshaft to a predetermined position for normal-rotational or reverse-rotational driving, after the engine is stopped,
wherein the controller comprises
a reverse-rotational drive controller configured to reverse-rotationally drive the motor at a rewinding control duty ratio immediately after the engine is stopped,
a reverse-rotation stop condition processor configured to detect whether the crankshaft is rewound to the predetermined position by the reverse-rotational drive controller, and
a motor brake controller configured to apply a brake to the crankshaft by reverse-rotationally driving the motor when it is detected that the crankshaft is rewound to the predetermined position,
wherein the motor brake controller is configured to apply the brake stepwise.

2. The engine start control system according to claim 1,
wherein the controller is configured to apply a duty ratio to the motor brake that is set to a value smaller than the rewinding control duty ratio, and
wherein the motor brake controller is configured to apply the brake stepwise using a plurality of different duty ratios.

3. The engine start control system according to claim 2,
wherein the motor brake configured to apply the brake stepwise while reducing the plurality of different duty ratios stepwise.

4. The engine start control system according to claim 3,
wherein the motor brake controller is configured to apply the brake stepwise using a first duty ratio and a second duty ratio smaller than the first duty ratio.

5. The engine start control system according to claim 4,
wherein the motor brake controller is configured to apply the brake at the first duty ratio for a first period of time and thereafter to apply the motor brake at the second duty ratio for a second period of time.

6. The engine start control system according to claim 1, further comprising:
a motor angle sensor configured to detect a rotation angle of the motor,
wherein the reverse-rotation stop condition processor is configured to determine whether the crankshaft is rewound to the predetermined position when a measured passage time reaches a value not less than a multiplied value of a previous measured passage time based on a time at which a rotation angle detected by the motor angle sensor passes.

7. The engine start control system according to claim 1, further comprising:
a motor angle sensor configured to detect a rotation angle of the motor,
wherein the reverse-rotation stop condition processor is configured to determine whether the crankshaft is rewound to the predetermined position when it is determined that the crankshaft turns into a normal-rotation from a reverse-rotation based on a passage state of a rotation angle detected by the motor angle sensor.

8. The engine start control system according to claim 1, further comprising:
a throttle opening degree sensor configured to detect a throttle opening degree,
wherein the controller is configured to restart the engine when an output value of the throttle opening degree sensor exceeds a predetermined value during the idle stop control, and during the application of the motor brake, is configured to start the normal-rotational drive of the motor to restart the engine when an output value of the throttle opening degree sensor exceeds the predetermined value.

9. The engine start control system according to claim 8, wherein during the application of the reverse-rotational drive, the controller is configured to stop the reverse-rotational drive and to start normal-rotational drive of the motor to restart the engine when rotation speed of the crankshaft exceeds a predetermined value and an output value of the throttle opening degree sensor exceeds a predetermined value.

10. An engine start control system, comprising:
controlling means for performing an idle stop control to stop an engine based on an establishment of a condition; and
driving means for reverse-rotationally driving a crankshaft to a predetermined position for normal-rotational or reverse-rotational driving, after the engine is stopped,
wherein the controlling means comprises
reverse-rotational drive controlling means for reverse-rotationally driving the motor at a rewinding control duty ratio immediately after the engine is stopped,
reverse-rotation stop condition processing means for detecting whether the crankshaft is rewound to the predetermined position by the reverse-rotational drive controller, and
motor brake controlling means for applying a brake to the crankshaft by reverse-rotationally driving the motor when it is detected that the crankshaft is rewound to the predetermined position,
wherein the motor brake controlling means is for applying the brake stepwise.

11. A method, comprising:
performing, using a controller, an idle stop control to stop an engine based on an establishment of a condition; and
reverse-rotationally driving, using a motor, a crankshaft to a predetermined position for normal-rotational or reverse-rotational driving, after the engine is stopped,
wherein reverse-rotationally driving the crankshaft comprises
reverse-rotationally driving the motor at a rewinding control duty ratio immediately after the engine is stopped,
detecting whether the crankshaft is rewound to the predetermined position by the reverse-rotational drive controller, and
applying a brake to the crankshaft by reverse-rotationally driving the motor when it is detected that the crankshaft is rewound to the predetermined position, wherein the brake is applied stepwise.

12. The method of claim 11, wherein the applying the brake comprises applying a duty ratio to the motor brake that is set to a value smaller than the rewinding control duty ratio, and applying the brake stepwise using a plurality of different duty ratios.

13. The method of claim 12, wherein the applying the brake stepwise comprises reducing the plurality of different duty ratios stepwise.

14. The method of claim 13, wherein the applying the brake stepwise comprises using a first duty ratio and a second duty ratio smaller than the first duty ratio.

15. The method of claim 14, wherein the applying the brake comprises using the first duty ratio for a first period of time and thereafter applying the brake using the second duty ratio for a second period of time.

16. The method of claim 11, further comprising:
detecting a rotation angle of the motor; and
determining whether the crankshaft is rewound to the predetermined position when a measured passage time reaches a value not less than a multiplied value of a previous measured passage time based on a time at which a rotation angle detected by the motor angle sensor passes.

17. The method of claim 11, further comprising:
detecting a rotation angle of the motor; and
determining whether the crankshaft is rewound to the predetermined position when it is determined that the crankshaft turns into a normal-rotation from a reverse-rotation based on a passage state of a rotation angle detected by the motor angle sensor.

18. The method of claim 11, further comprising:
detecting a throttle opening degree; and
restarting the engine when an output value of the throttle opening degree sensor exceeds a predetermined value during the idle stop control, and during the application of the motor brake, starting the normal-rotational drive of the motor to restart the engine when an output value of the throttle opening degree sensor exceeds the predetermined value.

19. The method of claim 18, further comprising:
during the application of the reverse-rotational drive, stopping the reverse-rotational drive and starting normal-rotational drive of the motor to restart the engine when rotation speed of the crankshaft exceeds a predetermined value and an output value of the throttle opening degree sensor exceeds a predetermined value.

* * * * *